United States Patent [19]
Ohtsuka et al.

[11] Patent Number: 5,075,712
[45] Date of Patent: Dec. 24, 1991

[54] FILM LOADING DATE MEMORY STORAGE DEVICE FOR CAMERA

[75] Inventors: Masanori Ohtsuka; Kiyoshi Alyfuku, both of Kanagawa, Japan

[73] Assignee: Canon Kabushiki Kaisha, Tokyo, Japan

[21] Appl. No.: 338,403

[22] Filed: Apr. 12, 1989

Related U.S. Application Data

[63] Continuation of Ser. No. 198,730, May 23, 1988, abandoned, which is a continuation of Ser. No. 877,245, Jun. 23, 1986, abandoned.

[30] Foreign Application Priority Data

Jun. 26, 1985 [JP] Japan .................. 60-137697
Jun. 26, 1985 [JP] Japan .................. 60-137698
Jun. 26, 1985 [JP] Japan .................. 60-137699
Jun. 26, 1985 [JP] Japan .................. 60-137700

[51] Int. Cl.$^5$ ............................................. G03B 17/18
[52] U.S. Cl. ....................... 354/475; 354/105; 354/106; 354/289.1
[58] Field of Search ............... 354/21, 465, 471, 474, 354/475, 105, 106, 109, 289.1, 289.12

[56] References Cited

U.S. PATENT DOCUMENTS 2,714,844  8/1955  Heidecke .................. 354/289.1
4,330,186  5/1982  Hattori ........................ 354/106
4,365,881 12/1982  Hazama et al. ............ 354/106
4,420,236 12/1983  Taniguchi et al. ........ 354/289.12

FOREIGN PATENT DOCUMENTS 58-88229 6/1983 Japan .

Primary Examiner—Russell E. Adams
Attorney, Agent, or Firm—Toren, McGeady & Associates

[57] ABSTRACT

The film loading date memory storage device of a camera which includes a film winding spool, a clock device for counting the present date and time; a store for storing the date information obtained at the clock device when the camera is loaded with a roll of film; and a display which displays the information on the film loading date stored at the store. The device is provided with film loading date detecting device which produces and supplies a film loading date signal to the store by detecting that the leader part of the film is taken up on the film winding spool.

15 Claims, 10 Drawing Sheets

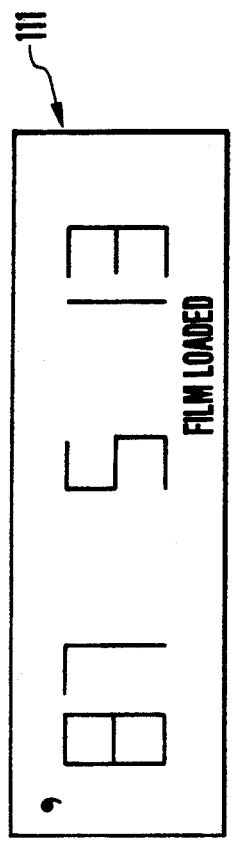
F I G.10(a)
F I G.10(b)
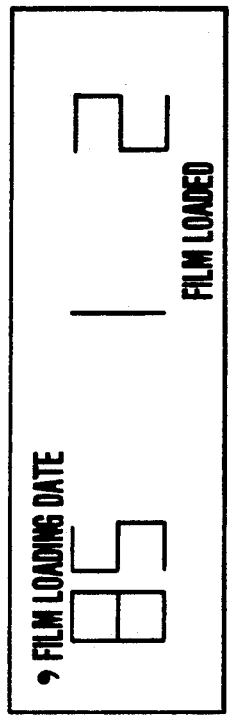
F I G.11
| | FILM LOADING DATE DISPLAYING FUNCTION | DATA IMPRINTING FUNCTION | CORRECTING FUNCTION |
|---|---|---|---|
| WHILE FILM LOADING DATE IS ON DISPLAY | ○ | INHIBITED | INHIBITED |
| WHILE DATA IMPRINTING IS IN PROCESS | INHIBITED | ○ | INHIBITED |
| WHILE CORRECTION IS IN PROCESS | INHIBITED | INHIBITED | ○ |
| WHEN FILM IS NOT LOADED | INHIBITED | ○ | ○ |

# FILM LOADING DATE MEMORY STORAGE DEVICE FOR CAMERA

This is a continuation of Ser. No. 07/198,730 filed May 23, 1988, which in turn is a continuation of Ser. No. 06/877,245 filed June 23, 1986 both abandoned.

BACKGROUND OF THE INVENTION

1. Field of the Invention

This invention relates to an improvement in a film loading date memory storage device for a camera which has storing means for memorizing a film loading date and is capable of displaying information on the date.

2. Description of the Related Art

Generally, one roll of film is seldom used up for photographing by a camera within a short period of time. The camera is often left loaded with the same roll of film before a next photographing occasion which sometimes arises after the lapse of a considerably long time. The loaded time of film might be forgotten. In the meantime, the warrantable period for the quality of film might have expired unnoticed. As a solution to this problem, a film loading date memory storage device has been proposed in Japanese Laid-Open Utility Model Application No. SHO 58-88229. According to this solution, closure of the back lid of a camera is mechanically or optically detected; information on a film loading date is stored; and the film loading date is displayed as necessary by a display part which normally shows information on the present date or time including the year, month, day, etc. However, this film loading date memory storage device of the prior art remains to be improved in varied points. For example, as disclosed in Japanese Laid-Open Utility Model Application No. SHO 58-88229, the device is arranged to memorize a film loading date by detecting the closure of the back lid. Therefore, if the back lid of the camera is inadvertently opened and closed without replacing the film, the stored memory would be cancelled and would be automatically renewed.

SUMMARY OF THE INVENTION

It is a general object of this invention to provide a film loading date memory storage device for a camera which is capable of eliminating the above-stated shortcomings of the prior art device.

It is a more specific object of this invention to provide a film loading date memory storage device wherein film loading date detecting means is arranged to give a film loading date signal to memory storing means upon detection that the fore end or leader part of a roll of film is taken up on a film winding spool and thus enables the device to be capable of accurately memorizing information on a film loading date.

These and further objects and features of this invention will become apparent from the following detailed description of a preferred embodiment thereof taken in connection with the accompanying drawings.

BRIEF DESCRIPTION OF THE DRAWINGS

FIGS. 10 (a) and 10 (b) show displays indicating the present date or time and a film loading date respectively.

FIG. 11 is a table showing inhibition of various functions.

DETAILED DESCRIPTION OF THE PREFERRED EMBODIMENT

Figure 1:
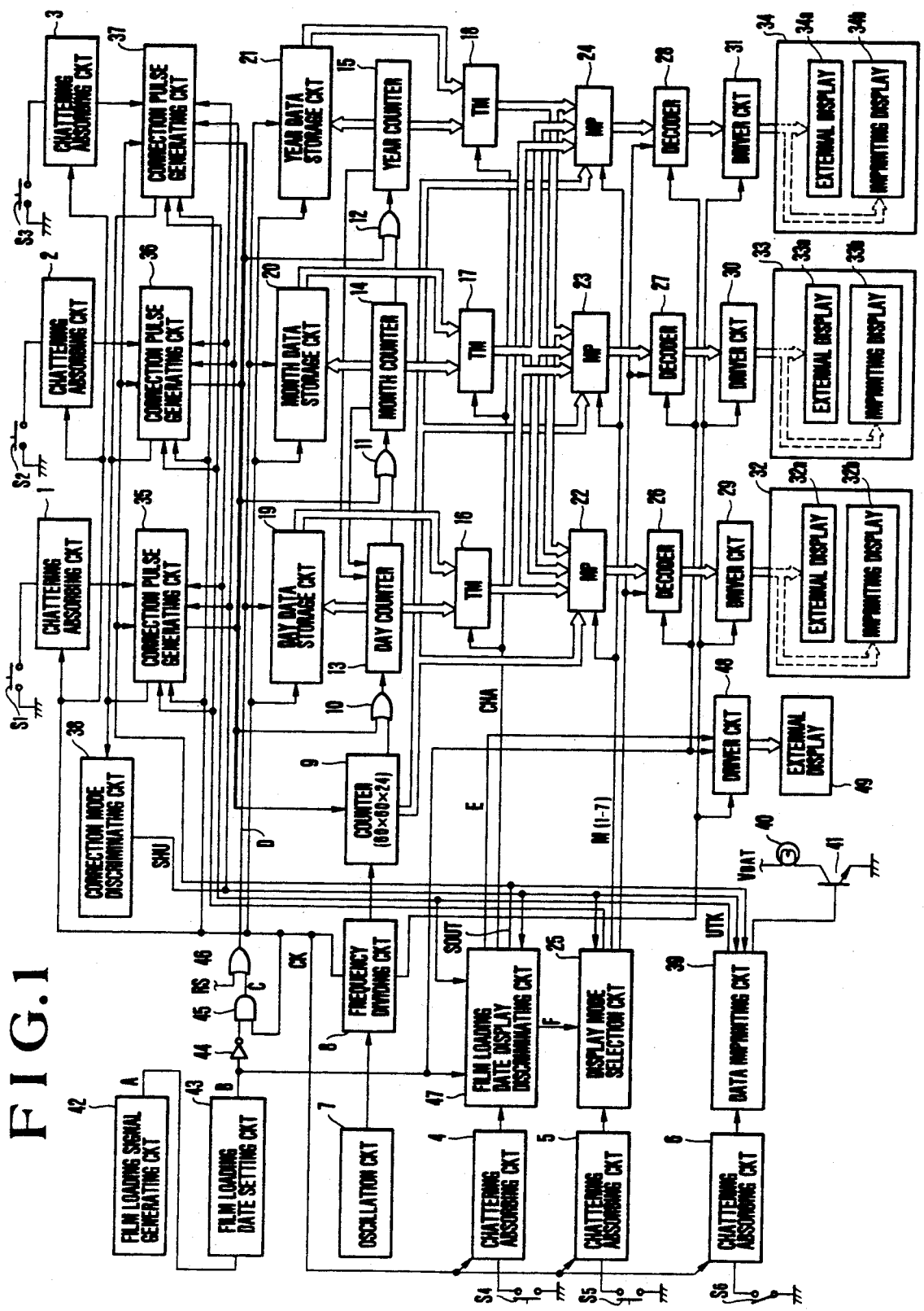
FIG. 1 is a block diagram showing an embodiment of this invention.

Referring to the accompanying drawings, a preferred embodiment of this invention is arranged as described in detail below:

FIG. 1 shows the embodiment in a block diagram. Switches S1, S2 and S3 are provided for adjustment or correction of the positions of corresponding counters which indicate the contents of day, month and year displays. A switch S4 is arranged to be used for displaying a film loading date. A switch S5 is for display mode selection. A switch S6 is for data imprinting. These switches S1 to S6 are provided with chatter absorbing circuits 1 to 6 for preventing erroneous actions due to chattering of these switches. An oscillation circuit 7 is provided for forming information in a standard time consisting of the year, month and day or the like. A frequency dividing circuit 8 is arranged to produce clock pulses of 1 Hz by frequency dividing the output of the oscillation circuit 7. A counter 9 is arranged to produce a day signal by counting (60×60×24) the output of the frequency dividing circuit 8. Reference numerals 10, 11 and 12 denote OR gates. A day counter 13 is arranged to count the output of the counter 9 to obtain data of day according to data of month and year indicating the number of days of the applicable month which is 28, 29, 30 or 31. A month counter 14 is arranged to count, in duodecimal notation, the output of the day counter 13. An year counter 15 is arranged to count up to 50 years by counting the output of the month counter 14. The counter 15 is provided with a time counting function for counting time from the oscillation circuit 7 up to the year counter 15 and then to automatically adjust the date of the end of each month. Transmission gates 16, 17 and 18 are arranged to determine, in accordance with a display change-over signal CHA coming from a film loading date display determining circuit 47, which is to be produced, the data of the day, month and year counters 13, 14 and 15 or the data of day, month and year data storage circuits 19, 20 and 21. Multiplexers 22, 23 and 24 (hereinafter referred to as MP's) are arranged to produce and supply the data, either in the sequence of year, month and day or in the sequence of month, day and year, to the ensuing stage in a mode according to a display mode signal among display mode signals M1 to M7 produced from a display mode selection circuit 25. The illustration includes decoders 26, 27 and 28; driver circuits 29, 30 and 31; and display devices 32, 33 and 34. Each of these display devices consists of an external display part 32a, 33a or 34a which makes a display of the present date and time and a display of a film loading date, and an imprinting display part 32b, 33b or 34b. Correction pulse generating circuits 35, 36 and 37 are arranged to generate pulses for correction over a given period when low level signals are received via the chatter absorbing circuits 1 to 3 from the switches S1 to S3. Each of these correction pulses thus generated is supplied to one of the counters designated by data produced from the display mode selection circuit 25. The correction pulse thus supplied renews the content of the applicable counter by +1. For example, in the "year, month and day" display mode, the correction pulse generating circuits 35, 36 and 37 supply the pulses to the day counter 13, the month counter 14 and the year counter 15 to renew their counted contents as applicable. A correction mode discriminating circuit 38 is arranged to judge that a correction is in process while the circuit 38 is in receipt of the correction pulse from any of the correction pulse generating circuits 35, 36 and 37, that is, when one of the switches S1, S2 and S3 is under a pushing operation. In that event, the circuit 38 produces a signal SHU indicative of that the correction is in process. The correction-in-process signal SHU is supplied to a film loading date display discriminating circuit 47, the display mode selection circuit 25 and a known data imprinting circuit 39, to inhibit thereby any display of a film loading date, change-over of the display mode and any data imprinting process. Further, during a data imprinting process, the data imprinting circuit 39 produces a data imprinting-in-process signal UTK to inhibit thereby any display of a film loading date and any correction of the data of year, month and day during the data imprinting process. A light source 40 for data imprinting is arranged to light up when a transistor 41 turns on. A film loading signal generating circuit 42 is arranged to produce a film loading signal A by detecting film loading when the film is taken up on a spool and the leader of the film is fed in blank up to a start point. The circuit 42 ceases to produce the signal A upon detection of removal of the film. A film loading date setting circuit 43 is arranged to discriminate whether the film loading signal A is a normal signal. If the signal A is found to be normal, the circuit 43 produces a "film loaded" display instruction signal B. An AND gate 45 is arranged to obtain a logical product of the output of an inverter 44 and a clock pulse signal CK. The AND gate 45 produces an AND signal C. An OR gate 46 is arranged to have two inputs and to produce an OR signal D. The two inputs of the OR gate are a reset signal RS and the AND signal C. The reset signal RS is a one-pulse signal which is generated after an initialization signal PUC is generated. With this reset signal RS generated, day, month and year data storage circuits 19, 20 and 21 come to store the date data of a point of time at which a counting operation begins. A film loading date display discriminating circuit 47 is arranged to supply a display change-over signal CHA to the transmission gates 16, 17 and 18 by detecting the rise of a signal which is obtained by removing the chattering of the output of the switch S4. The circuit 47 also produces and supplies a loading date display-in-process signal SOUT to correction pulse generating circuits 35, 36 and 37 and the data imprinting circuit 39 to inhibit thereby date correction and data imprinting from being performed; a film loading date setting signal E to a driver circuit 48; and a display selection signal F indicative of completion of selection of a film loading date to the display mode selection circuit 25 respectively. The driver circuit 48 is arranged to drive an external display part 49. The circuit 48 causes the external display part 49 to make a letter display reading "film loaded" upon receipt of the signal B and another letter display reading "film loading date" upon receipt of the film loading date setting signal E, respectively.

Figure 2:
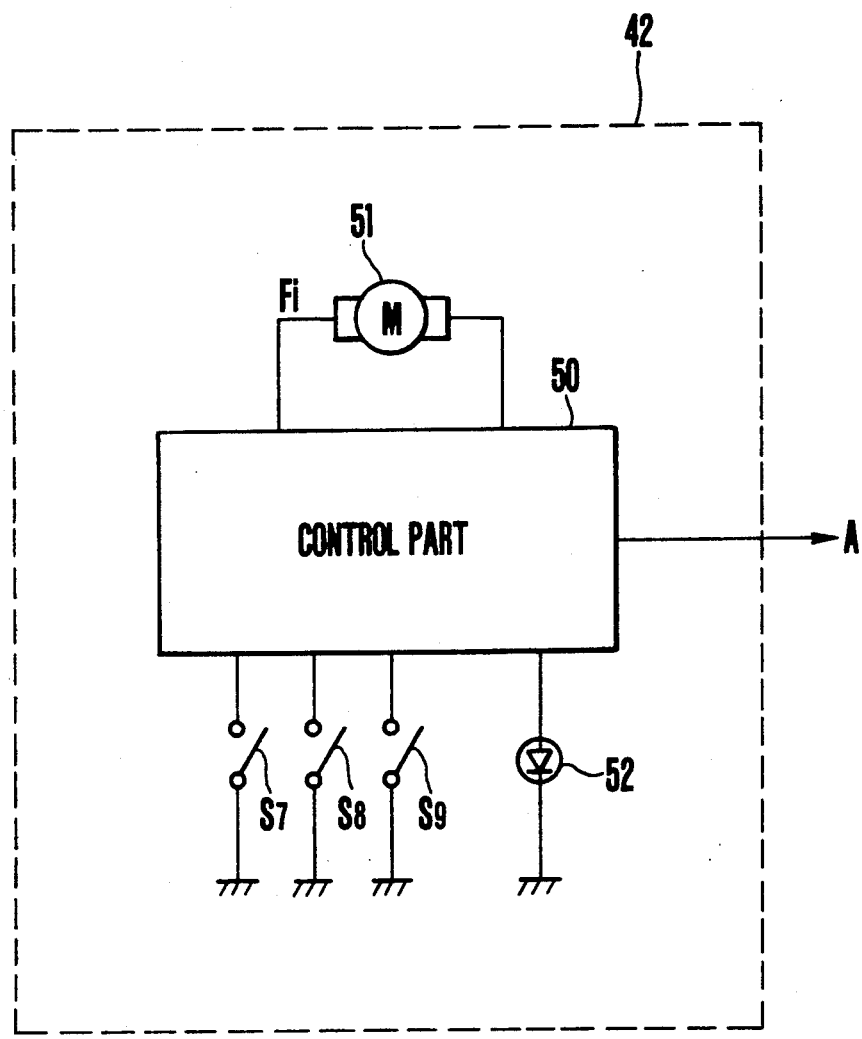
FIG. 2 is a diagram showing the essential parts of a film loading signal generating circuit of the same embodiment.

FIG. 2 shows in outline the arrangement of the film loading signal generating circuit 42. The circuit 42 includes a switch S7 which turns on and off in response to opening and closing of the back lid of the camera; a switch S8 which detects whether the film is set on an exposure plane; a film feeding state detecting switch S9 which turns on and off in response to film winding and rewinding processes; a control part 50 which is arranged to produce, upon receipt of on-and-off information from the switches S7, S8 and S9, a film feeding signal Fi for control over blank feeding of the film up to a start position and film winding and rewinding processes and to produce a film loading signal A upon detection of completion of automatic film loading with the film perfectly taken up on the spool; a motor 51 which serves as a drive source for film feeding; and a light emitting element 52 which is arranged to light up to give a warning in the event of a failure of the automatic film loading process.

Figure 3:
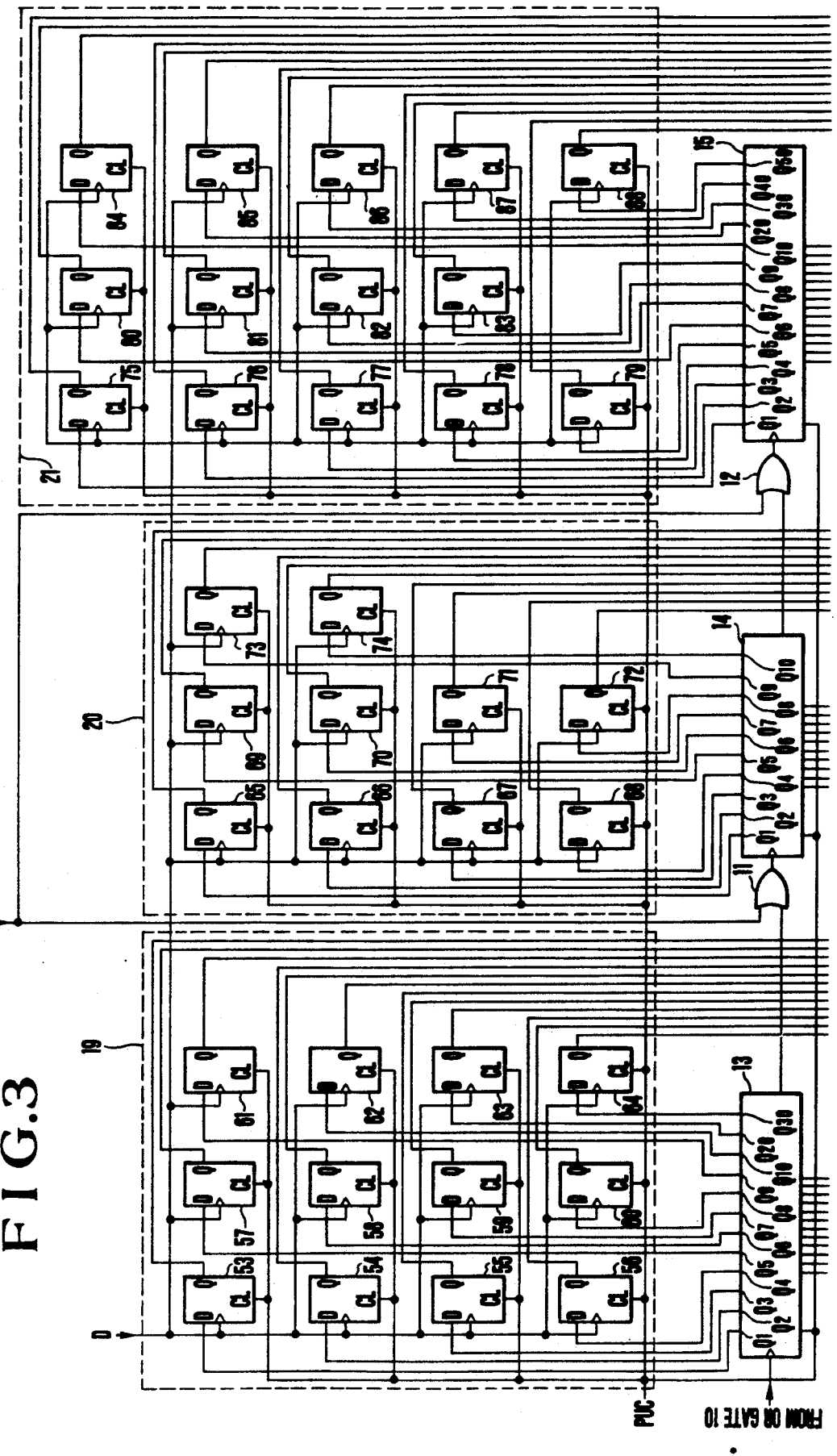
FIG. 3 is a circuit diagram showing, by way of example, the arrangement of a day-month-and-year information storing circuit of the same embodiment.

FIG. 3 shows, by way of example, the details of arrangement of the day, month and year data storage circuits 19, 20 and 21. The day data storage circuit 19 consists of D flip-flops 53 and 64. The month data storage circuit 20 consists of D flip-flops 65 to 74. The year data storage circuit 21 consists of D flip-flops 75 to 88. With the camera loaded with a film, the "film loaded" display instruction signal B is produced. The output level of the inverter 44 then becomes low to prevent the supply of the OR signal D (clock pulses CK) which repetitively alternates high and low levels. Therefore, the counted contents Qi of the day, month and year counters 13, 14 and 15 which are obtained before that point of time are retained as a film loading date. When the camera is not loaded with any film, the "film loaded" display instruction signal B is prevented from being produced. Therefore, in this case, the output of the inverter 44 becomes a high level signal to allow the clock pulse signal CK to be constantly supplied. As a result, stored data Qj is incessantly renewed. In other words, the counted contents of the day, month and year counters 13, 14 and 15 always coincide with the contents of the day, month and year data storage circuits 19, 20 and 21. Further, in case that the outputs of the day, month and year counters 13, 14 and 15 represent, for example, "11", the outputs of the output terminals Q10 and Q1 of the day, month and year counters 13, 14 and 15 all become high level signals while the rest remain as low level signals.

Figure 4:
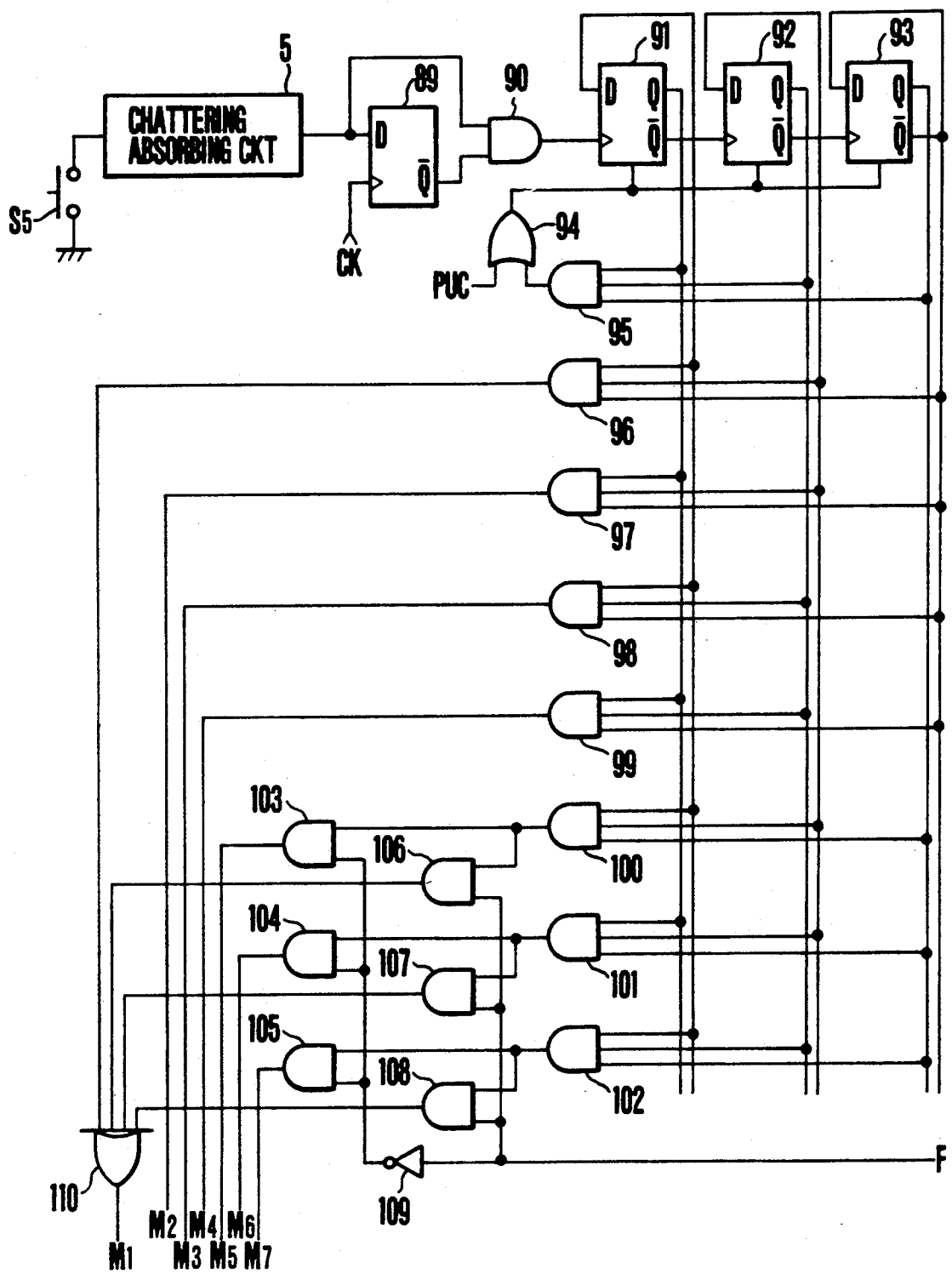
FIG. 4 is a circuit diagram showing, by way of example, the arrangement of a display mode selection circuit of the same embodiment.

FIG. 4 shows, by way of example, the details of the arrangement of the essential parts of the display mode selection circuit 25. The display mode selection circuit 25 comprises a D flip-flop 89; an AND gate 90; D flip-flops 91, 92 and 93 which form a 3-bit binary counter; an OR gate 94; AND gates 95 to 108; an inverter 109; and a 4-input OR gate 110. The circuit 25 is arranged to detect the rise of the output of the chatter absorbing circuit 5 obtained by removing chatter and to produce one of display mode signals M1 to M7 which corresponds to a display mode selected from among different modes of display such as "year-month-day", "month-day-year", "day-month-year", and so on. The display mode signals are arranged to be produced in the sequence of M1→M2→M3→M4→M5→M6→M7 every time the switch S5 is pushed. In this specific embodiment, a total of seven different display modes are arranged to be selectable by means of the switch S5 as mentioned above. The correlation of the different display modes with the display mode signals M1 to M7 is as shown below with reference to FIGS. 5(a) to 5(g):

"year-month-day" mode: display mode signal M1
"month-day-year" mode: display mode signal M2
"month (English)-day-year" mode: display mode signal M3
"day-month-year" mode: display mode signal M4
"day-hour-minute" mode: display mode signal M5
"hour-minute-second" mode: display mode signal M6
"OFF" mode: display mode signal M7

Figure 5:
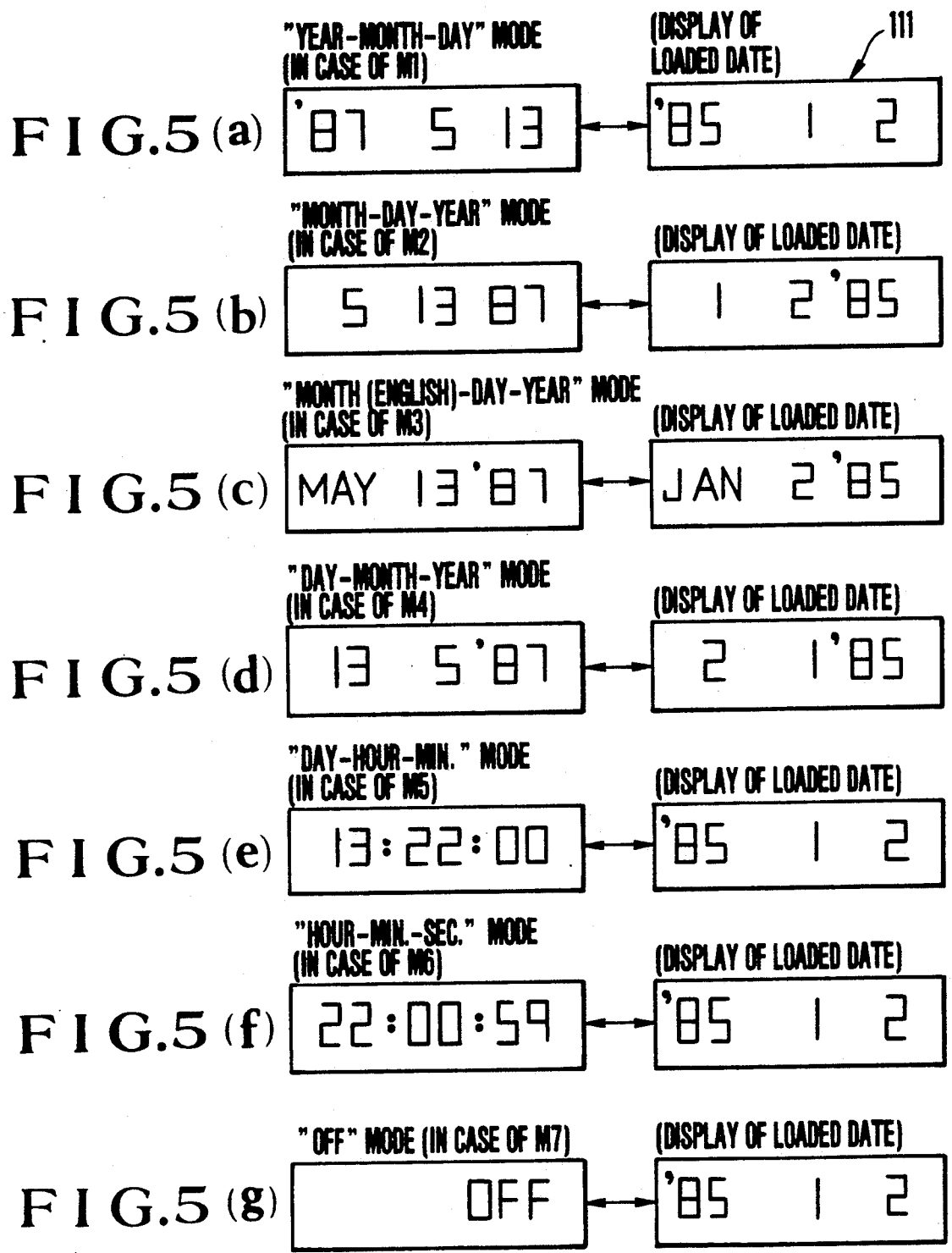
FIGS. 5 (a) to 5(g) are illustrations of displays made in various display modes of the same embodiment.
Figure 6:
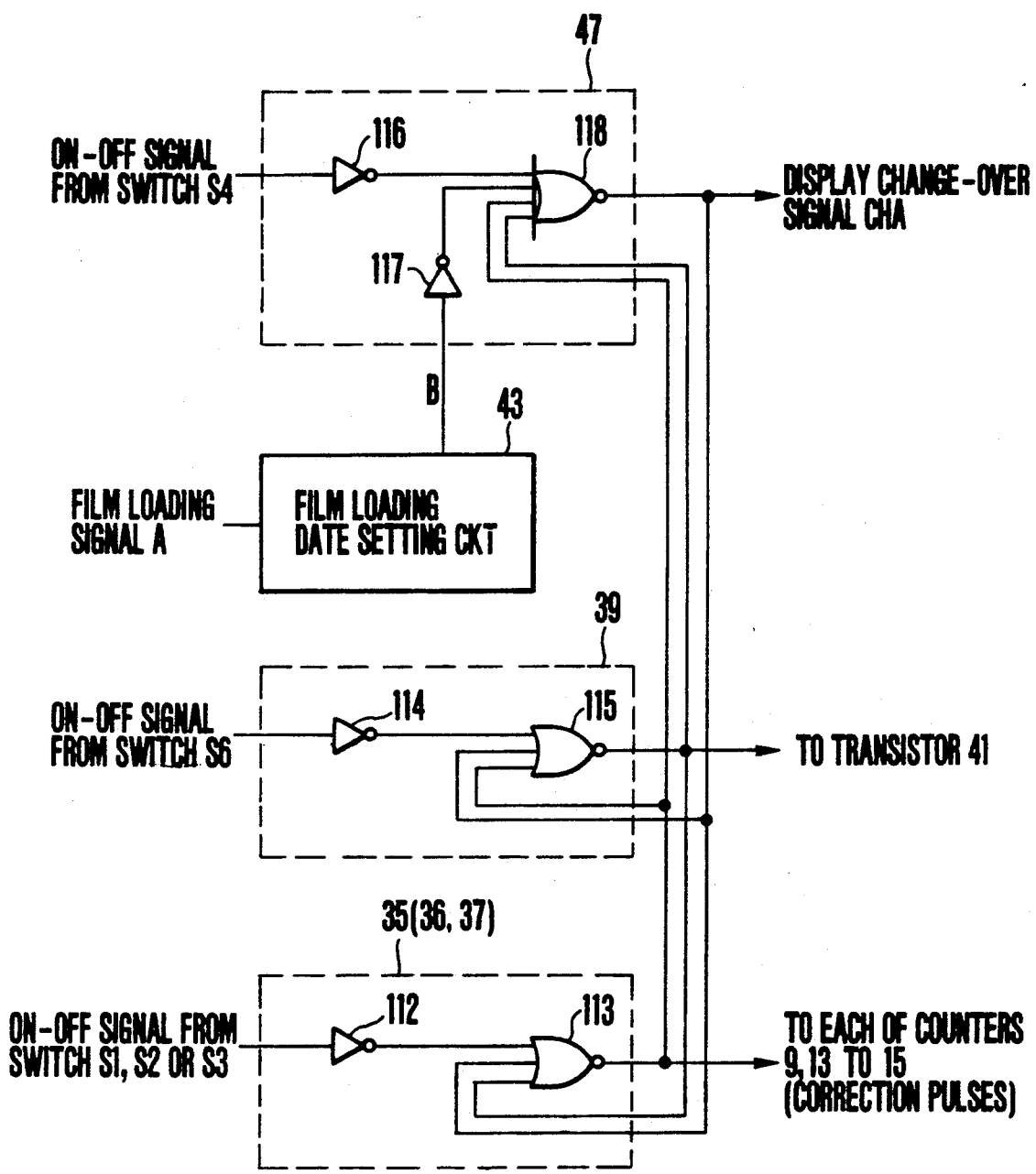
FIG. 6 is a is a circuit diagram showing a film loading date setting circuit and the essential parts of a data imprinting circuit and those of a correction pulse generating circuit of the same embodiment.

Referring to FIGS. 5(a) to 5(g), a reference numeral 111 denotes the external display parts 32a to 34a of the display devices 32 to 34 and the external display part 49. FIG. 6 shows the circuit arrangements of the essential parts of the above-stated correction pulse generating circuits 35, 36 and 37, the data imprinting circuit 39 and the film loading date display discriminating circuit 47. Each of the correction pulse generating circuits 35 and 37 includes an inverter 112 and an OR gate 113. The data imprinting circuit 39 includes an inverter 114 and a NOR gate 115. The film loading date display discriminating circuit 47 includes inverters 116 and 117 and a 4-input NOR gate 118.

Figure 7:
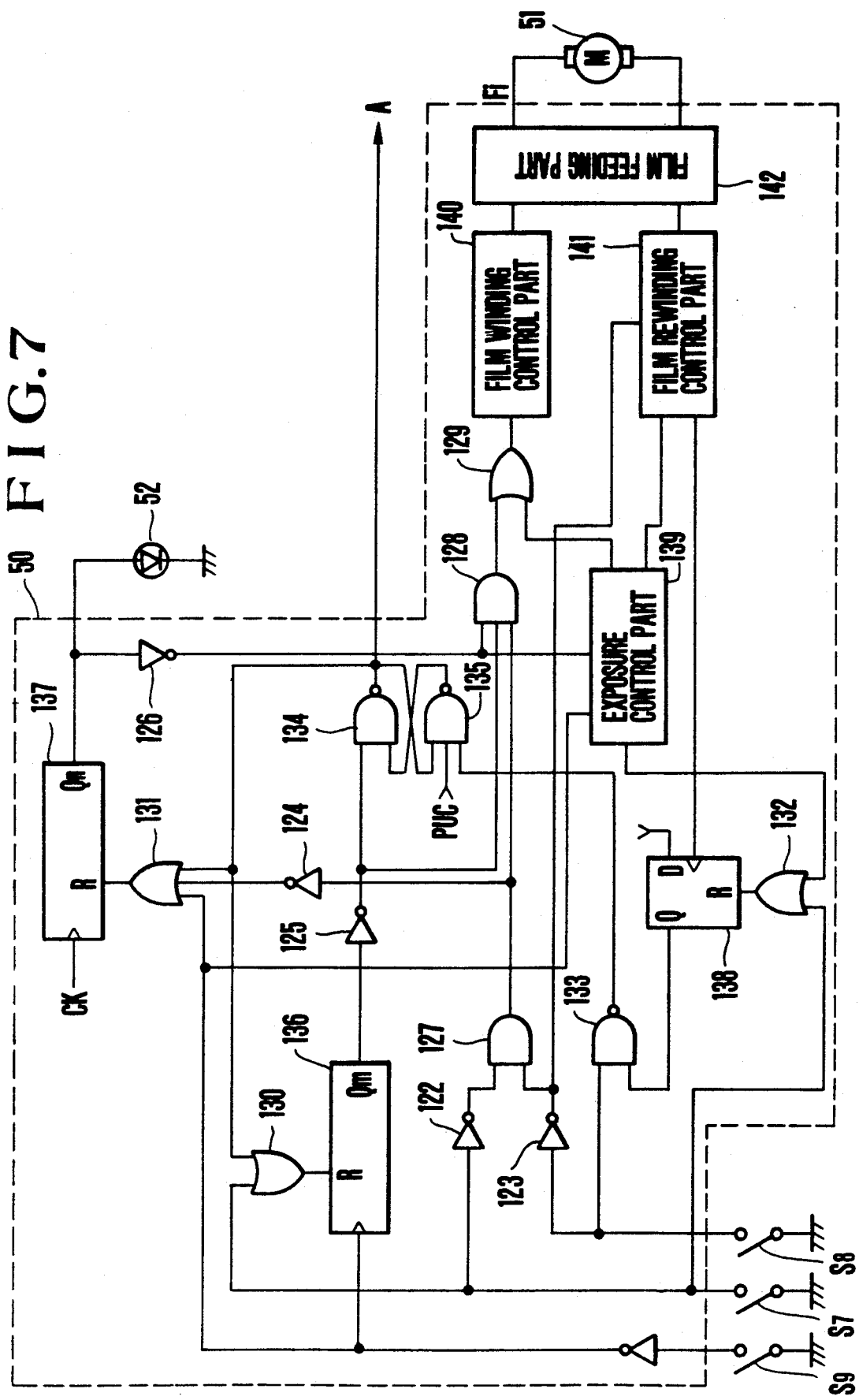
FIG. 7 is a circuit diagram showing by way of example, the arrangement of the film loading signal generating circuit of the same embodiment.

FIG. 7 shows, by way of example, the details of the circuit arrangement of the control part 50 of FIG. 2. The illustration includes inverters 122 to 126 and 143; AND gates 127 and 128; OR gates 129 to 132; a NAND gate 133; NAND gates 134 and 135 which form a latch part; a binary counter 136 which is arranged to count the number of performances of the on-off operation of the switch S9 and to produce from an output terminal Qm a high level signal when the number of operation performances of the switch S9 reaches a given number; a binary counter 137 which is arranged to begin to count the incoming clock pulses CK the instant it is released from a reset state and to produce a signal indicative of a failure of an automatic film loading process when the counted value reaches a given value; a D flip-flop 138; a known exposure control part 139; a film winding control part 140; a film rewinding control part 141; and a film feeding part 142 which is arranged to produce and supply a film feeding signal Fi to a motor 51.

Figure 8:
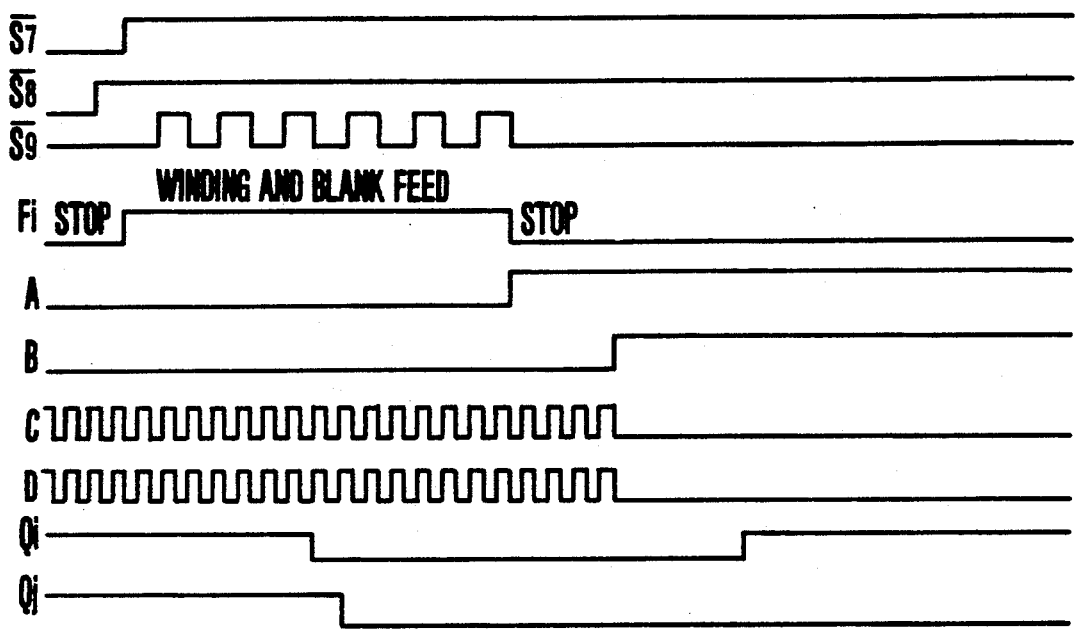
FIGS. 8 and 9 are time charts showing the operation of the same circuit.
Figure 9:
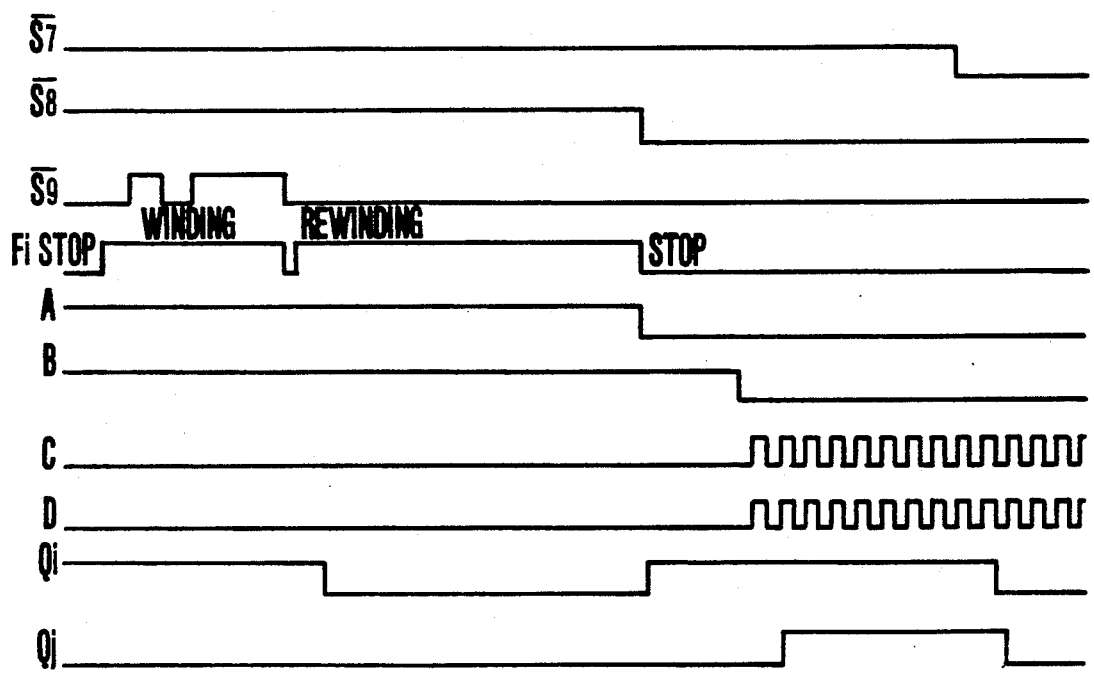

Referring to FIGS. 8, 9 and 10, the control part, which is arranged as described above, operates as follows: In loading the camera with a roll of film, the film is wound round the spool. When the back lid of the camera is closed, the switches S7 and S8 turn on. Then the output level of the AND gate 127 changes to a high level. The high level signal from the AND gate 127 comes to one of the input terminals of the AND gate 128. At that point of time, neither of the binary counters 136 and 137 has counted up to the given value. Hence, low level signals are being produced from their output terminals Qm and Qn. These low level signals are inverted into high level signals by the inverters 125 and 126 and are then supplied to one of the input terminals of the AND gate 128. Then, the AND gate 128 produces a high level signal. The high level signal from the AND gate is supplied via the OR gate 129 to the film winding control part 140. The film feeding part 142 then produces and supplies a film feeding signal Fi to the motor 51. A film winding action begins to blank feed the film up to the start position thereof. Upon commencement of the film winding action, the switch S9 comes to repetitively turn on and off according to the perforation provided in the film. This is counted via the inverter 143 by the binary counter 136. When the counted value of the counter 136 reaches a given value representing setting a number of the on-and-off operation repeating times of the switch required before arrival of film at the start position, the counter 136 begins to produce a high level signal from the output terminal Qm thereof. The high level signal is inverted by the inverter 125. The inverted signal is supplied to one of the input terminal of the AND gate 128 to make the output of the AND gate 128 into a low level signal. The low level signal causes the film feeding signal Fi to be no longer produced and thus brings the film winding action to a stop. Further, as mentioned in the foregoing, the low level signal produced from the inverter 125 is in the meantime retained at the latch part formed by the NAND gates 134 and 135. The low level signal is eventually supplied to the ensuing stage of circuit arrangement as the film loading signal A indicating completion of accurate film loading.

In the event of a failure in film loading, the film winding action is responded by no film movement. The switch S9, therefore, remains in an OFF state. The output of the binary counter 136 never becomes a high level signal. Meanwhile, the other binary counter 137 which is reset in the above-stated case in response to the on-and-off operation of the switch S9 is released from a reset state. Therefoer, the binary counter 137 begins to count incoming clock pulses CK and then comes to begin to produce a high level signal from its output terminal Qn after the lapse of a given period of time. This signal is supplied to the light emitting element 52 and via the inverter 126 to one of the input terminals of the AND gate 128. The light emitting element 52 then makes a warning display indicative of the failure of the automatic film loading process. Since the output level of the AND gate 128 becomes low concurrently with this display, a current supply to the motor 51 is cut off. In this instance, the film loading signal A is of course not produced.

With the control part arranged as described above, when the film loading signal A is produced from the film loading signal generating circuit 42 of FIG. 2, the film loading date setting circuit 43 of FIG. 1 determines whether the signal A is normal or not. In case that the signal A is determined to be normal, the film loading date setting circuit 43 produces the "film loaded" display instruction signal B. The signal B is supplied as a low level signal via the inverter 44 to one of the input terminals of the AND gate 45. The AND gate 45 then obtains a logical produce of this input and another input which is the clock pulses CK. In this case, the output of the AND gate 45 becomes a low level AND signal C. Therefore the output of the ensuing OR gate 46 becomes a low level OR signal D. As a result, the clock pulses CK cease to come to the day, month and year data storage circuits 19, 20 and 21. Accordingly, the counted contents Qi of the day, month and year counters 13, 14 and 15 obtained there at the point of time when the low level OR signal D is received are stored and retained at the day, month and year data storage circuits 19, 20 and 21 as the stored data Qj. In other words, the data representing the day, month and year of film loading is stored and retained irrespective of any changes in the present date or time data of the day, month and year counters 13, 14 and 15. Further, since the switch S4 has not been pushed under that condition, if the display mode of "year-month-day" has been selected, the display devices 32, 33 and 34 display the present date, for example, "87-5-13" as shown in FIG. 10(a). Meanwhile, the external display part 49 which has received the "film loaded" display instruction signal B makes a display indicative of "film loaded".

Next, a film loading date display is made in the following manner: When the switch S4 is pushed by the photographer, a signal thus produced is checked to see if it is a normal signal. Then, the film loading date display discriminating circuit 47 supplies the display change-over signal CHA to the transmission gates 16, 17 and 18. The outputs of the transmission gates are then changed from the data of the day, month and year counters 13, 14 and 15 to the data of the day, month and year data storage circuits 19, 20 and 21 and are transmitted to the multiplexers 22, 23 and 24. At that time, the multiplexers (MP's) 22, 23 and 24 are also in receipt of signals corresponding to a display mode selected by a pushing operation on the switch S5. In other words, these MP's are receiving the display mode signals M1 to M7 from the display mode selection circuit 25. In accordance with the selected display mode, these MP's 22, 23 and 24 select applicable signals. The outputs of them are guided to decoders 26, 27 and 28 and are displayed at the display devices 32, 33 and 34 via the driver circuits 29, 30 and 31. As a result, the film loading date is displayed in the display mode selected. For example, if the "year-month-day" mode is selected, the display mode selection circuit 25 produces the display mode signal M1. The display devices 32, 33 and 34 then make a display as shown in FIG. 5(a). If the "month (English)-day-year" mode is selected, the display mode selection circuit 25 produces the display mode signal M3 and a display is made as shown in FIG. 5(c). Further, in such a case as mentioned in the foregoing, the driver circuit 48 is in receipt of the "film loaded" display instruction signal B and the film loading date setting signal E. In this instance, the external display part 49 makes a letter display reading "film loaded" and another display reading "film loading date". (The display state of FIG. 10(a) changes to the display state of FIG. 10(b).) Next, in cases where the data imprinting switch S6 or the date correcting switches S1, S2 and S3 are continuously operated by pushing them while the switch S4 is under a pushing operation in the process of changing the external display part 111 from the present date or time display state to the film loading date display state, the embodiment operates as follows: In this instance, the display change-over signal CHA which is produced from the NOR gate 118 comes to one of the input terminals of each of the NOR gates 113 and 115. Therefore, even if the data imprinting switch S6 is under a pushing operation, no high level signal is applied from the NOR gate 115 to the transistor 41. Likewise, even if the date correcting switches S1, S2 and S3 are placed under a pushing operation, no correction pulse is supplied from the NOR gate 113 to the counters 9, 13, 14 and 15. In other words, a data imprinting action and a date correcting action are inhibited. Further, even if the switches S1 to S4 are continuously pushed while the data imprinting switch S6 is under a pushing operation, no input is allowed from these switches S1 to S4 because a high level output produced from the NOR gate 115 is supplied to one of the input terminals of each of the NOR gates 113 and 117. In the event that the correcting switches S1, S2 and S3 are first operated, no input is likewise allowed from the switches S4 and S6. It is conceivable that the film loading date display switch S4 might be inadvertently pushed even when the camera is loaded with no film. In such a case, it is preferable to have an arrangement to inhibit any display of film loading date while keeping the display in the normal display mode because, in such a case, no display also becomes available. The inhibiting arrangement described above is summarized in FIG. 11. Further, in the embodiment shown in FIG. 1, the film loading date information is limited to the temporal data of day, month and year. Therefore, when the "day-hour-min" mode, the "hour-min-sec" mode or "OFF" mode is selected, no display of the loading date is obtainable. In this specific embodiment, therefore, if a display selection signal F is produced from the film loading date display discriminating circuit 47 while one of these display modes is selected, the selected display mode is arranged to be changed into an year-month-day display mode. The details of this arrangement is as shown by way of example in FIG. 4. Referring to FIG. 4, every time the switch S5 is pushed, the rise of the output of this switch S5 causes the D flip-flop 89 and the AND gate 90 to generate a single pulse. This pulse is applied to the binary counter which is composed of the flip-flops 91, 92 and 93. Thus, every time one pulse is received, i.e. every time the switch S5 is pushed, one of the display mode signals are produced in rotation in the sequence of M1→M2→M3→M4→M5→M6→M7. Therefore, since the output of the inverter 109 becomes a low signal when the display selection signal F is produced from the film loading date display discriminating circuit 47, it is arranged such that the display mode signals M5, M6 and M7 are not produced even if the above-stated modes ("day-hour-min", "hour-min-sec" and "OFF" display modes) are selected. In this case, one of the outputs of the AND gates 106, 107 and 108 is selected. Under such a condition, therefore, the display mode signal M1 is produced and the external display part 111 makes a display in a manner as shown in one of FIGS. 5(e) to 5(g).

Upon completion of photographing on a predetermined number of frame portions of film, the control part 50 of FIG. 2 supplies a film feeding signal Fi to the motor 51. A film rewinding action begins. When the control part 50 detects completion of film rewinding, the current supply to the motor 51 is cut off. At the same time, the film loading signal A comes to be no longer produced as shown in FIG. 9. While the film loading signal A is not generated, the OR signal D (clock pulses CK) which alternately repeats low and high levels begins to come. As a result, the counted contents Qi of the day, month and year counters 13, 14 and 15 begin to come to the day, month and year data storage circuits 19, 20 and 21. Meanwhile, the stored data Qj (film loading date) which has been retained within the day, month and year data storage circuits 19, 20 and 21 is cancelled and is renewed at a rise of the above-stated OR signal D.

Figure 12:
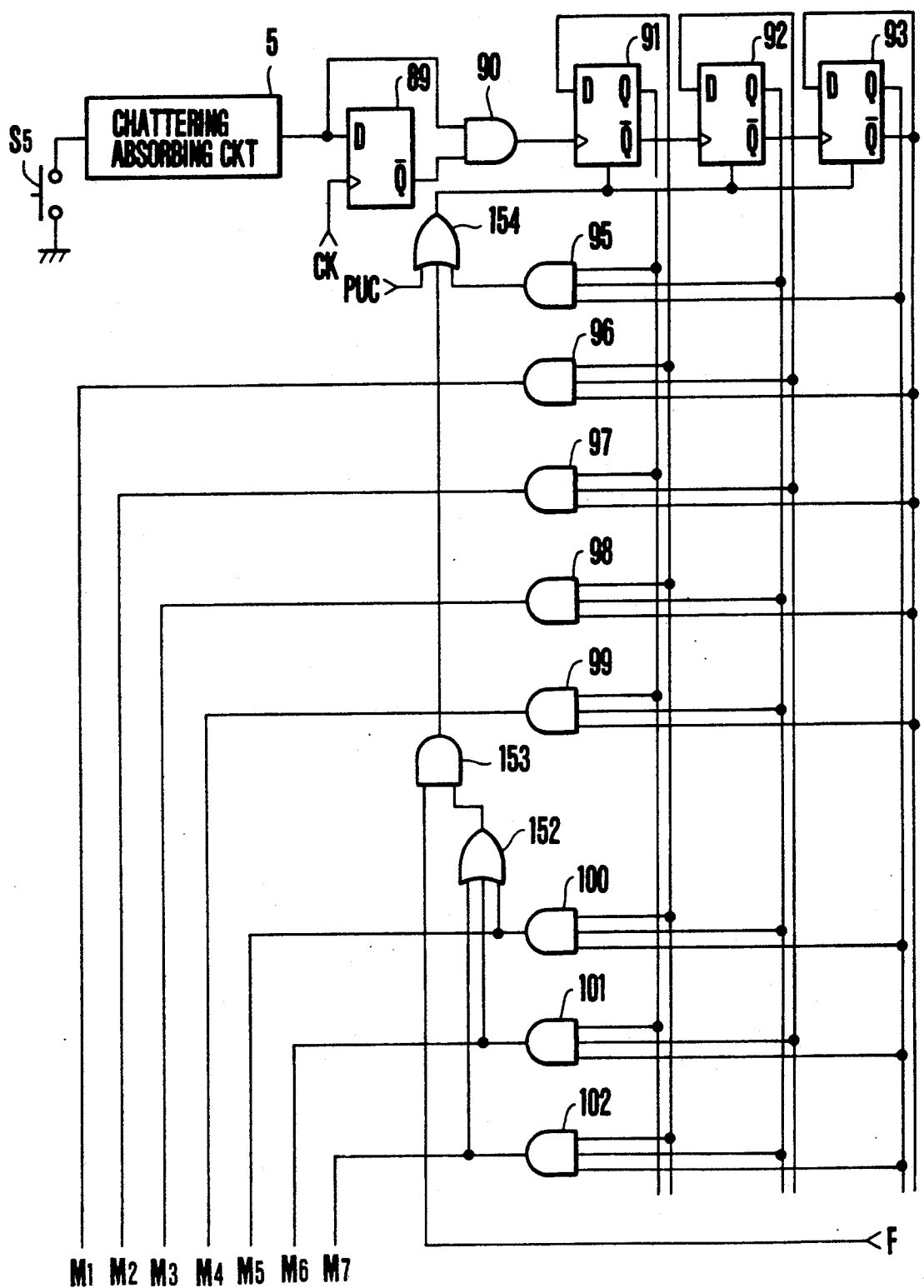
FIG. 12 is a circuit diagram showing another example of arrangement of the display mode selection circuit of the same embodiment.

In the embodiment described, if the camera is in the "day-hour-min", "hour-min-sec" or "OFF" display mode, a film loading date is arranged to be displayed in the "year-month-day" mode by producing the display mode signal M1. However, this arrangement may be changed to have the display mode signals produced in rotation in the sequence of M1→M2→M3→M4→M1→M2, instead of the sequence mentioned in the foregoing, only in the event of displaying a film loading date. One example of such modification is arranged as shown in FIG. 12. In the case of FIG. 12, if the display mode is changed over to the film loading date display mode while the camera is, for example, in the "day-hour-min" display mode, a high level signal which is equivalent to one pulse is produced from a 3-input OR gate 152 and is applied via an AND gate 153 and a 3-input OR gate 154 to the binary counters 91, 92 and 93 to reset them. Therefore, the data of a film loading date is displayed in the "year-month-day" mode at the external display part 111. Following this, the display mode changes in the sequence of the "month-day-year" mode, "month (English)-day-year" —one after another.

In the embodiment described, the film loading signal A is arranged to be produced when the film is adequately loaded. However, this arrangement may be changed to have the signal produced after detection of completion of photographing on the first frame portion of film; or, with a switch arranged within the spool to turn on when the film is wound on the spool, to have the signal produced upon detection of that this switch has turned on. Anyway, the film loading date signal A is arranged to be generated at least after confirmation that the fore end of the film is adequately wound round the spool.

The shortcomings of the conventional film loading date memory storage device can be eliminated in accordance with the arrangement of this invention described in the foregoing. The device according to this invention is provided with the film loading date detecting means which supplies storage means with a film loading date signal by detecting that the fore end of the film is wound round the spool. Thus, the day on which the fore end of film is wound round the spool is determined to be the film loading date. The invented arrangement ensures that the film loading date can be accurately memorized even if the back lid of the camera is opened and closed without loading or replacing the film.

Further, in accordance with this invention, a film loading date can be displayed in the same mode as the present time display mode. This gives a readily discernible display. In case that the camera is loaded with film, the present time display is provided with an indication "film loaded". This arrangement prevents the display of the film loading date from being mistaken for that of the present date or time; facilitates a check-up for accurate film loading; and therefore also obviates the necessity for a film loading window.

In cases where the camera is set in a relatively unimportant display mode such as the "hour-min-sec" display mode or the like, the display mode is automatically changed over to the "year-month-day" display mode in displaying a film loading date. Therefore, information on the film loading date is obtainable irrespective of the presently selected display mode.

Further, in accordance with this invention, the date or time data correcting means is inhibited from operating while a film loading date is on display. By this arrangement, the extent to which correction has been made is prevented from becoming unknown. Conversely, the change-over to the film loading date display by the display change-over means is inhibited by inhibiting means while the date or time correcting means is in operation, so that correction can be carried on without interruption. The invented arrangement, therefore, facilitates the time correcting operation which is in relation to the display of a film loading date.

Further, since the present date or time is arranged to be not displayed on the display device while a film loading date is on display, the data imprinting action is also not performed during that period. This effectively prevents erroneous data imprinting on the film. Conversely, the film loading date display is inhibited while data imprinting is in process. Therefore, the possibility of double imprinting the present date or time and a film loading date on the film can be eliminated.

In addition to these advantages, the invention gives various other advantages as mentioned in the foregoing description of the preferred embodiments.

What is claimed is:

1. A photosensitive material loading date memory storage device for a camera, comprising:
    a) photosensitive material take-up means for winding said photosensitive material;
    b) signal generating means arranged to produce a photosensitive material winding signal when said material has been taken up by said take-up means; and
    c) memory storing means which is responsive to said photosensitive material winding signal produced from said signal generating means and is arranged to store, as a photosensitive material loading date, the day on which said signal is produced.

2. A device according to claim 1, wherein said photosensitive material take-up means includes a spool.

3. A device according to claim 1, wherein said signal generating means includes blank feeding completion detecting means which is arranged to detect completion of a blank feeding action on said photosensitive material and to produce said photosensitive material winding signal upon said detection.

4. A device according to claim 1, further comprising indicating means for indicating the content of said memory storing means.

5. A device according to claim 4, wherein said indicating means includes selection means for selectively indicating said material loading date or the present date or time.

6. A device according to claim 5, wherein said indicating means includes indentifying means for identifying said photosensitive material loading date in indicating said material loading date.

7. A device according to claim 5, further comprising control means for causing said indicating means to indicate the present date or time in one of varied modes, said control means being arranged to cause said photosensitive, material loading date t be indicated in a mode corresponding to said mode selected in indicating said present date or time.

8. A device according to claim 7, wherein said control means includes correction means which, in case where said photosensitive material loading date cannot be indicated in said mode corresponding to said present date or time indicating mode, causes said loading date to be indicated in some other mode.

9. A device according to claim 5, further comprising inhibiting means for inhibiting correction of said present date or time while said indicating means is indicating a photosensitive material loading date.

10. A device according to claim 5, further comprising inhibiting means for inhibiting said present date or time from being imprinted while said indicating means is indicating a photosensitive material loading date.

11. A photosensitive material loading time memory storage device for a camera, comprising:
  a) indicating means for indicating the time for which said camera has been loaded with a photosensitive material, said indicating means being arranged to selectively indicate the material loaded time or the present date or time; and
  b) control means for causing said indicating means to indicate the present date or time in one of various modes, said control means being arranged to cause said indicating means to indicate said material loaded time in a mode corresponding to said mode selected in indicating said present date or time.

12. A device according to claim 11, wherein said control means includes correction means which, in case where said photosensitive material loaded time cannot be indicated in said mode corresponding to said present date or time indicating mode, causes said loaded time to be indicated in some other mode.

13. A device according to claim 11, wherein said indicating means includes identifying means for identifying said photosensitive material loaded time in indicating said photosensitive material loaded time.

14. A photosensitive material loading time memory storage device for a camera, comprising:
  a) indicating means for indicating the time for which said camera has been loaded with a photosensitive material, said indicating means being arranged to selectively indicate the material loaded time or the present date or time; and
  b) inhibiting means for inhibiting correction of said present date or time while said indicating means is indicating a photosensitive material loaded time.

15. A photosensitive material loaded time memory storage device for a camera, comprising:
  a) indicating means for indicating the time for which said camera has been loaded with a photosensitive material, said indicating means being arranged to selectively indicate the material loaded time or the present date or time; and
  b) inhibiting means for inhibiting said photosensitive material loaded time from being imprinted while said indicating means is indicating a photosensitive material loaded time.

* * * * *